US011153380B2

(12) United States Patent
Leshinsky et al.

(10) Patent No.: US 11,153,380 B2
(45) Date of Patent: Oct. 19, 2021

(54) CONTINUOUS BACKUP OF DATA IN A DISTRIBUTED DATA STORE

(71) Applicant: Amazon Technologies, Inc., Seattle, WA (US)

(72) Inventors: Yan Valerie Leshinsky, Kirkland, WA (US); Lon Lundgren, Kirkland, WA (US); Raman Mittal, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/791,154

(22) Filed: Feb. 14, 2020

(65) Prior Publication Data

US 2020/0186602 A1 Jun. 11, 2020

Related U.S. Application Data

(63) Continuation of application No. 14/977,453, filed on Dec. 21, 2015, now Pat. No. 10,567,500.

(51) Int. Cl.
*G06F 15/16* (2006.01)
*H04L 29/08* (2006.01)

(52) U.S. Cl.
CPC ...... *H04L 67/1095* (2013.01); *H04L 67/1076* (2013.01); *H04L 67/1097* (2013.01)

(58) Field of Classification Search
USPC .......................................................... 709/219
See application file for complete search history.

(56) References Cited

U.S. PATENT DOCUMENTS 5,586,264 A 12/1996 Belknap et al.
5,615,364 A 3/1997 Marks
5,692,177 A 11/1997 Miller
(Continued)

FOREIGN PATENT DOCUMENTS

| CN | 104750773 | 7/2015 |
|---|---|---|
| WO | 2012168365 | 12/2012 |
| WO | 2014141343 | 9/2014 |

OTHER PUBLICATIONS

Amazon Web Services, "Amazon DynamoDB Developer Guide", API Version, Aug. 10, 2012, pp. 1-793.
(Continued)

*Primary Examiner* — Anthony Mejia
(74) *Attorney, Agent, or Firm* — Robert C. Kowert; Kowert, Hood, Munyon, Rankin & Goetzel, P.C.

(57) ABSTRACT

A distributed data store may provide continuous backup for data stored in the distributed data store. Updates to data may be replicated amongst storage nodes according to a peer-to-peer replication scheme. A backup node may participate in the peer-to-peer replication scheme to identify additional updates to be applied to a backup version of the data in a separate data store. The backup node may obtain the updates according to the peer-to-peer replication scheme and update the backup version of the data. In some embodiments, configuration changes to the data in the distributed data store may be detected via the peer-to-peer replication scheme such that a backup node can adapt performance of backup operations in conformity with the configuration change.

20 Claims, 13 Drawing Sheets

(56) References Cited

U.S. PATENT DOCUMENTS 5,768,527 A 6/1998 Zhu et al.
5,842,222 A 11/1998 Nishimura et al.
5,991,772 A 11/1999 Doherty et al.
6,085,200 A 7/2000 Hill et al.
6,161,109 A 12/2000 Matamoros et al.
6,199,074 B1 3/2001 Kern et al.
6,272,598 B1 8/2001 Arlitt et al.
6,374,266 B1 4/2002 Shnelvar
6,374,267 B1 4/2002 Tam
6,397,351 B1 5/2002 Miller et al.
6,505,216 B1 1/2003 Schutzman et al.
6,651,077 B1 11/2003 East et al.
6,728,879 B1 4/2004 Atkinson
7,054,910 B1 * 5/2006 Nordin ................ G06F 11/2094 709/208
7,096,392 B2 8/2006 Sim-Tang
7,308,545 B1 * 12/2007 Kekre ................. G06F 11/2097 707/999.202
7,328,226 B1 2/2008 Karr et al.
7,330,859 B2 2/2008 Gupta et al.
7,343,356 B2 3/2008 Prahlad et al.
7,353,241 B2 4/2008 Erlingsson
7,373,364 B1 5/2008 Chapman
7,386,586 B1 6/2008 Headley et al.
7,509,358 B1 3/2009 Bingham et al.
7,546,428 B1 6/2009 McAndrews et al.
7,565,661 B2 7/2009 Sim-Tang
7,606,481 B2 10/2009 Kuruma
7,606,841 B1 10/2009 Ranade
7,606,844 B2 10/2009 Kottomtharayil
7,653,668 B1 1/2010 Shelat et al.
7,657,781 B1 2/2010 Dixon et al.
7,668,876 B1 2/2010 Kulkarni
7,680,843 B1 3/2010 Panchbudhe et al.
7,689,597 B1 3/2010 Bingham et al.
7,716,186 B2 5/2010 Cannon et al.
7,730,034 B1 6/2010 Deflaux et al.
7,792,802 B1 9/2010 Rao
7,802,001 B1 9/2010 Petry et al.
7,921,077 B2 4/2011 Ting et al.
7,949,662 B2 5/2011 Farber et al.
8,041,679 B1 10/2011 Narayanan
8,065,278 B2 11/2011 Beatty et al.
8,078,582 B2 12/2011 Wang et al.
8,095,745 B1 1/2012 Schmidt et al.
8,108,343 B2 1/2012 Wang et al.
8,117,164 B2 2/2012 Spektor et al.
8,150,805 B1 * 4/2012 Tawri .................. H04L 67/1095 707/629
8,161,255 B2 4/2012 Anglin et al.
8,166,263 B2 4/2012 Prahlad et al.
8,190,960 B1 5/2012 Bahadur et al.
8,200,615 B2 6/2012 Halliday
8,244,679 B1 8/2012 Bilsborough
8,255,739 B1 8/2012 Chatterjee et al.
8,332,842 B2 12/2012 Bauer et al.
8,359,596 B2 1/2013 Kobayashi et al.
8,364,648 B1 1/2013 Sim-Tang
8,386,631 B2 2/2013 Nilsson et al.
8,386,771 B2 2/2013 Baker et al.
8,463,633 B2 6/2013 Jung et al.
8,467,387 B2 * 6/2013 Chaturvedi ......... H04L 61/2575 370/389
8,478,726 B2 7/2013 Habermann et al.
8,488,661 B2 7/2013 Menon et al.
8,510,270 B2 8/2013 Pareek et al.
8,521,695 B2 8/2013 Zwilling et al.
8,533,478 B2 9/2013 Aguilera et al.
8,548,945 B2 10/2013 Dwyer et al.
8,560,639 B2 * 10/2013 Murphy .............. G06F 11/1446 709/219
8,566,286 B1 10/2013 Hawton et al.
8,572,091 B1 10/2013 Sivasubramanian et al.
8,612,700 B1 12/2013 Armstrong et al.
8,626,709 B2 1/2014 Isaacson et al.
8,635,187 B2 1/2014 Beatty et al.
8,650,155 B2 2/2014 Corbin et al.
8,676,752 B2 3/2014 Kundu et al.
8,712,970 B1 4/2014 Sim-Tang
8,719,362 B2 5/2014 Wu et al.
8,725,934 B2 5/2014 Batwara et al.
8,805,810 B2 8/2014 Lucas
8,818,954 B1 8/2014 Bergant et al.
8,825,938 B1 9/2014 Ellard et al.
8,892,938 B1 11/2014 Sundaram et al.
8,966,027 B1 * 2/2015 Brandwine ......... H04L 67/1029 709/221
9,183,200 B1 11/2015 Liu et al.
9,183,268 B2 11/2015 Novick et al.
9,235,606 B1 1/2016 Mooney et al.
9,552,382 B2 1/2017 Barrus
9,558,078 B2 1/2017 Farlee et al.
9,703,640 B2 7/2017 Beatty et al.
9,720,620 B1 8/2017 Wei et al.
9,720,991 B2 8/2017 Kritchko et al.
9,785,510 B1 10/2017 Madhavarapu et al.
10,162,715 B1 12/2018 MacDonald McAlister et al.
2002/0114341 A1 8/2002 Sutherland et al.
2002/0143798 A1 * 10/2002 Lisiecki .............. H04L 67/1008
2002/0152299 A1 10/2002 Traversat et al.
2003/0220935 A1 11/2003 Vivian et al.
2004/0215803 A1 10/2004 Traversat et al.
2005/0022213 A1 1/2005 Yamagami
2005/0188256 A1 8/2005 Stager et al.
2005/0251540 A1 11/2005 Sim-Tang
2006/0020634 A1 1/2006 Huras et al.
2006/0053262 A1 3/2006 Prahlad et al.
2006/0095547 A1 * 5/2006 Cohn .................. H04L 67/2847 709/220
2006/0100972 A1 5/2006 Chianese et al.
2006/0253600 A1 11/2006 Hannuksela
2007/0027937 A1 2/2007 McGrattan et al.
2007/0162516 A1 7/2007 Thiel et al.
2007/0250835 A1 10/2007 Kobayashi et al.
2007/0255763 A1 * 11/2007 Beyerle ................. G06F 16/275
2007/0276884 A1 11/2007 Hara et al.
2007/0288530 A1 12/2007 Romem et al.
2008/0147821 A1 * 6/2008 Dietrich .............. G06F 16/1834 709/216
2008/0294696 A1 11/2008 Frandzel
2009/0125362 A1 5/2009 Reid et al.
2009/0157777 A1 * 6/2009 Golwalkar .............. H04L 67/28
2009/0238262 A1 9/2009 Miceli
2009/0271412 A1 * 10/2009 Lacapra .................. G06F 3/067
2009/0271605 A1 10/2009 Park et al.
2010/0005259 A1 1/2010 Prahlad et al.
2010/0257138 A1 10/2010 Wang et al.
2010/0257140 A1 10/2010 Davis et al.
2010/0262717 A1 10/2010 Critchley et al.
2010/0274762 A1 10/2010 Murphy et al.
2011/0141882 A1 6/2011 Rieschl et al.
2011/0178985 A1 7/2011 San Martin Arribas et al.
2011/0258239 A1 10/2011 Petrocelli
2012/0166401 A1 6/2012 Li et al.
2012/0209817 A1 8/2012 Golab et al.
2012/0221715 A1 8/2012 Hamada
2012/0250682 A1 10/2012 Vincent et al.
2012/0265890 A1 10/2012 Carlson et al.
2012/0303999 A1 11/2012 Calder et al.
2012/0317274 A1 12/2012 Richter et al.
2012/0317583 A1 12/2012 Corbea et al.
2013/0018853 A1 1/2013 Jayaraman et al.
2013/0073724 A1 3/2013 Parashar et al.
2013/0124466 A1 5/2013 Naidu et al.
2013/0124483 A1 5/2013 Furuhashi et al.
2013/0132604 A1 5/2013 Cohen et al.
2013/0151683 A1 6/2013 Jain et al.
2013/0152047 A1 6/2013 Moorthi et al.
2013/0166556 A1 6/2013 Baeumges et al.
2013/0262388 A1 10/2013 Sorenson et al.
2013/0262389 A1 10/2013 Rathof et al.
2013/0290642 A1 10/2013 Huang et al.
2013/0346366 A1 12/2013 Ananthanarayanan et al.

(56) References Cited

U.S. PATENT DOCUMENTS

2014/0019413 A1 1/2014 Braam et al.
2014/0019421 A1 1/2014 Jagadeesan
2014/0046906 A1 2/2014 Patiejunas et al.
2014/0047263 A1 2/2014 Coatney et al.
2014/0181042 A1 6/2014 Toyama et al.
2014/0279884 A1* 9/2014 Dantkale ............... G06F 16/182 707/620
2014/0279905 A1 9/2014 Muniswamy-Reddy et al.
2014/0324785 A1 10/2014 Gupta et al.
2014/0358844 A1 12/2014 Mundlapudi et al.
2015/0172412 A1 6/2015 Escriva et al.
2015/0269183 A1* 9/2015 Avati .................. G06F 16/2358 707/634
2016/0065641 A1* 3/2016 Chesluk .................. H04L 67/02 709/219
2016/0077744 A1 3/2016 Pundir et al.
2016/0077923 A1 3/2016 Zhang et al.
2016/0127465 A1* 5/2016 Barstow ................ G06F 16/273 707/620
2017/0192860 A1* 7/2017 Vijayan ................. G06F 3/0619
2017/0242767 A1* 8/2017 Wang ...................... G06F 12/02
2018/0004828 A1* 1/2018 Kathuria ................. H04L 67/26
2019/0171532 A1* 6/2019 Abadi ................. G06F 11/1456

OTHER PUBLICATIONS

Amazon Web Services, "Amazon DynamoDB Streams API Reference", API Version, Aug. 10, 2012, pp. 1-29.
U.S. Appl. No. 14/077,173, filed Nov. 11, 2013, Marvin Michael Theimer et al.
U.S. Appl. No. 14/077,171, filed Nov. 11, 2013, Marvin Michael Theimer et al.
U.S. Appl. No. 14/136,624, filed Dec. 20, 2013, Marvin Michael Theimer et al.
U.S. Appl. No. 14/136,645, filed Dec. 20, 2013, Marvin Michael Theimer et al.
U.S. Appl. No. 14/077,167, filed Nov. 11, 2013, Marvin Michael Theimer et al.
U.S. Appl. No. 14,077,162, filed Nov. 11, 2013, Marvin Michael Theimer et al.
U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.
"Oozie—Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
Sigmod Record, "Parallel Data Processing with MapReduce: A Survey", Kyong-Ha Lee, et al., pp. 11-20, Dec. 2011.
Splunk Inc., "Splunk for Application Management", pp. 1-2, 2012.
GitHub, "Rationale", pp. 1-2, Oct. 8, 2011.
GitHub, "Tutorial", pp. 1-8, Oct. 8, 2013.
U.S. Appl. No. 13/764,716, filed Feb. 11, 2013, Kathryn Marie Shin et al.
U.S. Appl. No. 13/764,711, filed Feb. 11, 2013, Kathryn Marie Shin et al.
U.S. Appl. No. 61/738,967, filed Dec. 18, 2012, Kathryn Marie Shin et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
U.S. Appl. No. 15/717,614, filed Sep. 27, 2017, Vaibhav Jain.
U.S. Appl. No. 15,717,606, filed Sep. 27, 2017, Vaibhav Jain.
"Cloud Spanner: TrueTime and External Consistency", Retrieved from URL: https://cloud.google.com/spanner/docs/true-time-external-consistency on Feb. 28, 2018, pp. 1-6.
Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.
Barbara Liskov, "Practical Uses of Synchronized Clocks in Distributed Systems", ACM, copyright 1991 ACM, pp. 1-9.
James C. Corbrett, et al., "Spanner: Google's Globally-Distributed Database", Published in the Proceeding of OSDI 2012, 2012, pp. 1-14.
Friedemann Mattern, "Virtual Time and Global States of Distributed Systems", In the Proceedings of the International Workshop on Parallel and Distributed Algorithms, Oct. 1988, pp. 120-134.
U.S. Appl. No. 15/918,920, filed Mar. 12, 2018, Tate Andrew Certain, et al.
"Capturing Table Activity with DynamoDB Streams", dated Oct. 19, 2018, pp. 1-8.
Randall Hunt "New—Amazon DynamoDB Continuous Backups and Points-In-Time Recpvery", Mar. 26, 2018, pp. 1-9.

(56) References Cited

OTHER PUBLICATIONS

"Appendix E. Realese Notes", (PostgreSQL: Documentation: 10: E.144. Release 9.0.7), Oct. 19, 2018, pp. 1-4.
"PostgreSQL: The World's Most Advanced Open Source Relational Database", (https://www.postgresql.org), dated Oct. 19, 2018, pp. 1-10.
U.S. Appl. No. 14/977,472, filed Dec. 21, 2015, Akshat Vig.
U.S. Appl. No. 15/676,933, filed Aug. 14, 2017, Elizabeth Sanocki.
U.S. Appl. No. 15/728,271, filed Oct. 9, 2017, Pradeep Jnana Madhavarapu.
U.S. Appl. No. 16/231,109, filed Dec. 21, 2018, Grant Alexander MacDonald McAlister.
U.S. Appl. No. 15/807,367, filed Nov. 8, 2017, Vaibhav Jain.
U.S. Appl. No. 15/920,207, filed Mar. 13, 2018, Akshat Vig.
U.S. Appl. No. 16/101,153, filed Aug. 10, 2018, Akshat Vig.
U.S. Appl. No. 15/920,193, filed Mar. 13, 2018, Akshat Vig.
U.S. Appl. No. 16/197,033, filed Nov. 20, 2018, Rachit Jain.

* cited by examiner

CONTINUOUS BACKUP OF DATA IN A DISTRIBUTED DATA STORE

This application is a continuation of U.S. patent application Ser. No. 14/977,453, filed Dec. 21, 2015, which are hereby incorporated in reference herein in its entirety.

BACKGROUND

Data storage systems have implemented many different storage schemes for efficiently and reliability persisting data. Storage schemes implemented on a distributed system architecture are often deployed when storage system client applications, such as database systems, require greater availability of the data persisted in the data storage system. Common solutions to making data available including storing one or more versions or replicas of data on multiple storage nodes. However, by increasing the number of versions or replicas, the complexity and operational costs for generating consistent backups of persisted data increases. For example, synchronization protocols may complicate generating and maintaining backup versions of data for storage systems. Generating backup versions of data volumes may need access to the data volume in order to perform. However, consistency schemes may limit the ability for backup operations to perform if, for instance, another system operation or the storage client itself is accessing the data volume. Alternatively, storage client operations may be blocked or delayed while backup operations are performed. Neither the delay of backup operations or client operations is ideal, and may reduce overall data storage performance and reliability.

Figure 1:
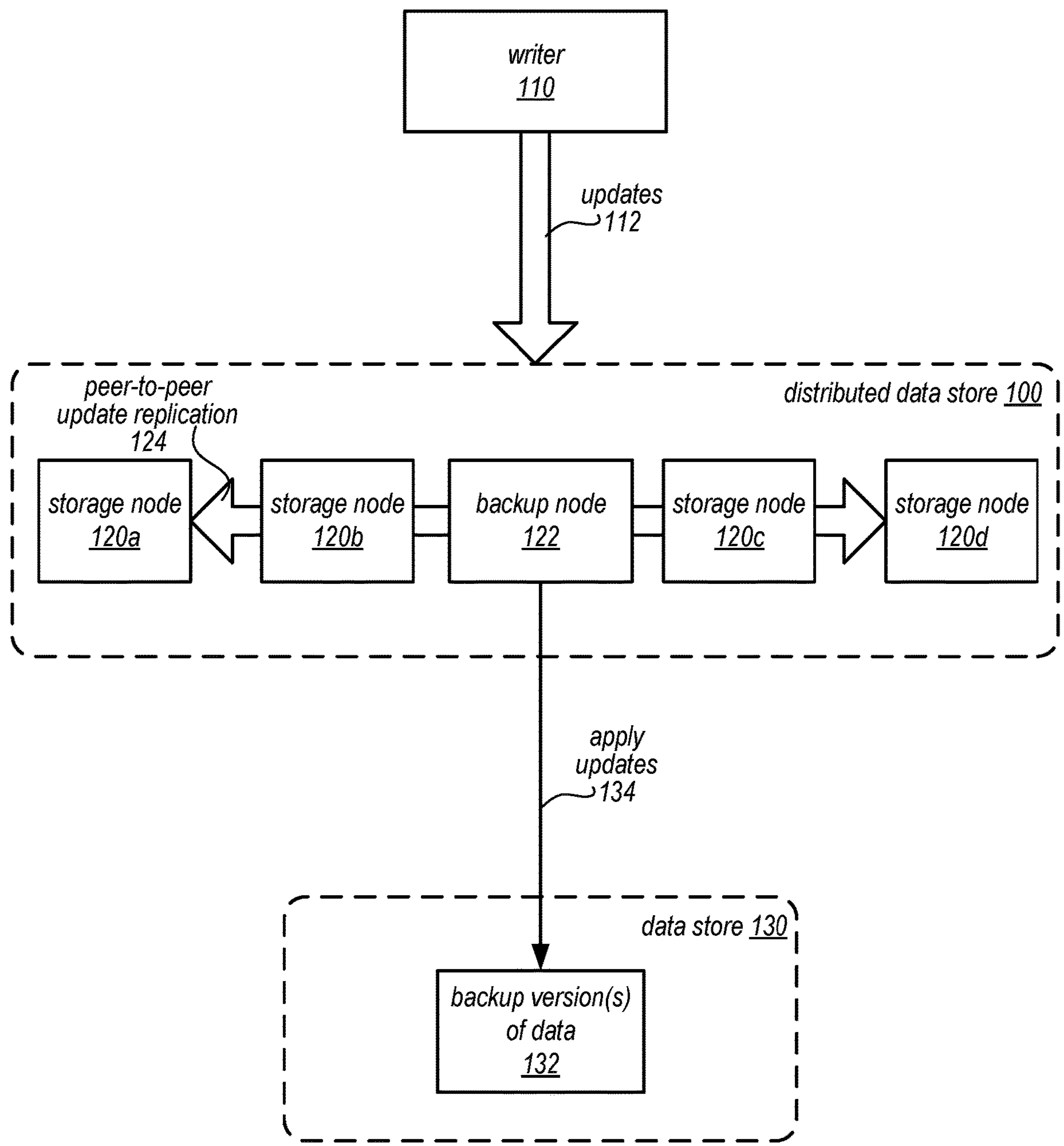
FIG. 1 is a logical block diagram illustrating continuous backup of data in a distributed data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of providing volume recovery access in a distributed data store for multiple recovery agents are described herein. A distributed data store may provide storage for various storage clients. These storage clients may include many different types of applications or services which rely upon the distributed data store to provide reliable and consistent access to stored data (which may be referred to herein as a "data volume"). For example, a database system, such as described below with regard to FIGS. 2-9 may utilize a distributed data store as the backend storage for a database. According to the needs of applications and services that rely upon the distributed data store, a distributed data store may be configured to provide varying types of backup versions of a data volume that may be accessed and/or restored (e.g., in the event of a failure or erroneous change to the data volume to be undone). For instance, backup versions of a data volume may be associated with different points in time so that a deserved version of the data volume at a particular time may be generated (e.g., to roll back certain changes or events to the data volume).

Generally, the more backup versions of a data volume retained at different points in time, the greater the likelihood a backup version of the data volume exists in desired state. However, operations to generate backup versions of a data volume can interrupt the performance foreground operations, such as I/O operations to write new or modify data in the data volume or read data from the data volume. Oftentimes, operations to generate a backup version of a data volume completely halt or block I/O operations, so that a consistent version of the data volume may be backed up. Continuous backup of data in a distributed data store may leverage the replication scheme of a data store, such as a peer-to-peer replication scheme, so that updates to a data volume may be replicated to a backup version of the data volume without interrupting or blocking performance of I/O to the data volume.

FIG. 1 is a logical block diagram illustrating continuous backup of data in a distributed data store, according to some embodiments. Writer 110 may be a client or other system, component or device with rights to access data stored in distributed data store 100. Distributed data store 100 may maintain the data across multiple storage nodes, such as storage nodes 120*a*, 120*b*, 120*c*, and 120*d*, in order to maintain multiple replicas of the data. In order to ensure that changes to the data are consistently made across the storage nodes 120, a peer-to-peer update replication scheme 124 may be implemented so that changes made to the data at one storage node (e.g., at storage node 120*a*) are discovered or communicated to other storage nodes (e.g., storage nodes 120*b*, 120*c*, and 120*d*) which did not receive the changes to the data directly. Data store 130 may be a separate data store (e.g., implemented as part of a separate storage system or service) that maintains backup version of data 132 separate from the data in distributed data store 100.

As illustrated in FIG. 1, writer 110 may perform various updates 112 to change, add, modify, and/or remove data (or representations of the changes to be made to the data, such as the redo log records discussed below with respect to FIGS. 2-9), stored in distributed data store 100. Updates 112 may be directed to one or multiples ones of the storage nodes 120 (e.g., according to a quorum model such that a minimum number of storage nodes out of a group of storage nodes may acknowledge an update 112 before that update 112 is considered durable by writer 110). Storage nodes 120 that receive the updates 112 may allow other storage nodes to discover the updates via peer-to-peer update replication 124. For example, peer-to-peer update replication may be implemented as a gossip-based protocol where storage nodes that receive an update forward, send, or otherwise share the update with other storage nodes. In some embodiments, peer-to-peer update replication may allow other storage nodes to ask about the state of data on another storage node, including any changes that have been made to the data, and ask for copies of the changes to the data. In this way, storage nodes may utilize peer-to-peer update replication 124 to proactively or passively learn about updates 112.

Backup node 122 may be implemented so as to participate in peer-to-peer update replication 124. For example, backup node 122 may be identified by other storage nodes 120 as a storage node peer that is sent updates received at storage nodes 120. Backup node 122 may send peer-to-peer requests to ask about the state of the data on a storage node (e.g., storage node 120*c*) to determine whether storage node 120*c* has received any updates 112 about which the backup node is unaware. Based on various indications and other information shared with backup node 122 via peer-to-peer update replication, backup node 122 may obtain updates 112 that have made to data. Backup node 122 may then apply the updates 134 to backup version(s) of data 132 in a separate data store 130. In this way backup operations to obtain updates 112 are non-disruptive to the application of new updates 112 (or other I/O operations such as requests to read data), and may appear, from the perspective of a clients of the distributed data store 100 and from the perspective of the distributed data store as another "storage node" participating in the replication of updates 112. Moreover, updates may be continuously applied to a backup version so that multiple versions of data can be maintained (e.g., as may be described by a log of updates) and the backup version of data 132 is close to the current state of the data (minimizing potential data loss in the event of a failure at distributed data store).

Backup node 122 may also dynamically detect and adapt backup operations to respond to changes in the configuration of data as it is stored in distributed data store 100. For example, a data volume may be stored in multiple different extents (e.g., as discussed below with regard to FIG. 9) that are replicated amongst multiple storage nodes that make up a protection group for each extent. Member nodes of protection groups may change (e.g., due to failures, reassignments, etc.), and backup node 122 may detect these changes when communicating with storage nodes in a protection group (e.g., utilizing the same detection mechanisms that member nodes use). Backup nodes 122 may also determine data configuration changes when the size of data changes (e.g., expands) to ensure that peer-to-peer replication with additional storage nodes storing the expanded data is participated in/observed as well. Events that change the configuration of data, such as recovery operations to determine a consistent state of data in the event of writer or data store failures may also be detected by backup node 122.

Please note, FIG. 1 is provided as a logical illustration of a distributed data store providing continuous backup of data, and is not intended to be limiting as to the physical arrangement, size, or number of components, modules, or devices, such as the number of backup nodes, implementing a distributed data store, writer, peer-to-peer replication, or a separate data store maintaining backup data versions.

The specification first describes an example of a distributed data store as a distributed storage service, according to various embodiments. The example distributed storage service may store data for many different types of clients, in various embodiments. One such client may be a network-based database service, described in further detail below. Included in the description of the example network-based database service are various aspects of the example network-based database service along with the various interactions between the database service, the distributed storage service, and a separate data store maintaining backup versions of data volumes in the distributed storage service. The specification then describes a flowchart of various embodiments of methods for continuous backup for data in a distributed data store. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), a separate, distributed storage system (which may include multiple storage nodes that collectively perform some of the operations traditionally performed in the database tier of existing systems), and a backup storage tier.

As described in more detail herein, in some embodiments, some of the lowest level operations of a database, (e.g., backup, restore, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process. In some embodiments, the storage layer may maintain backup versions of data volumes in a separate storage system (e.g., another storage service implemented as part of network-based services platform 200) by leveraging peer-to-peer replication among storage nodes to identify and obtain new updates to data volumes for inclusion in backup versions.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
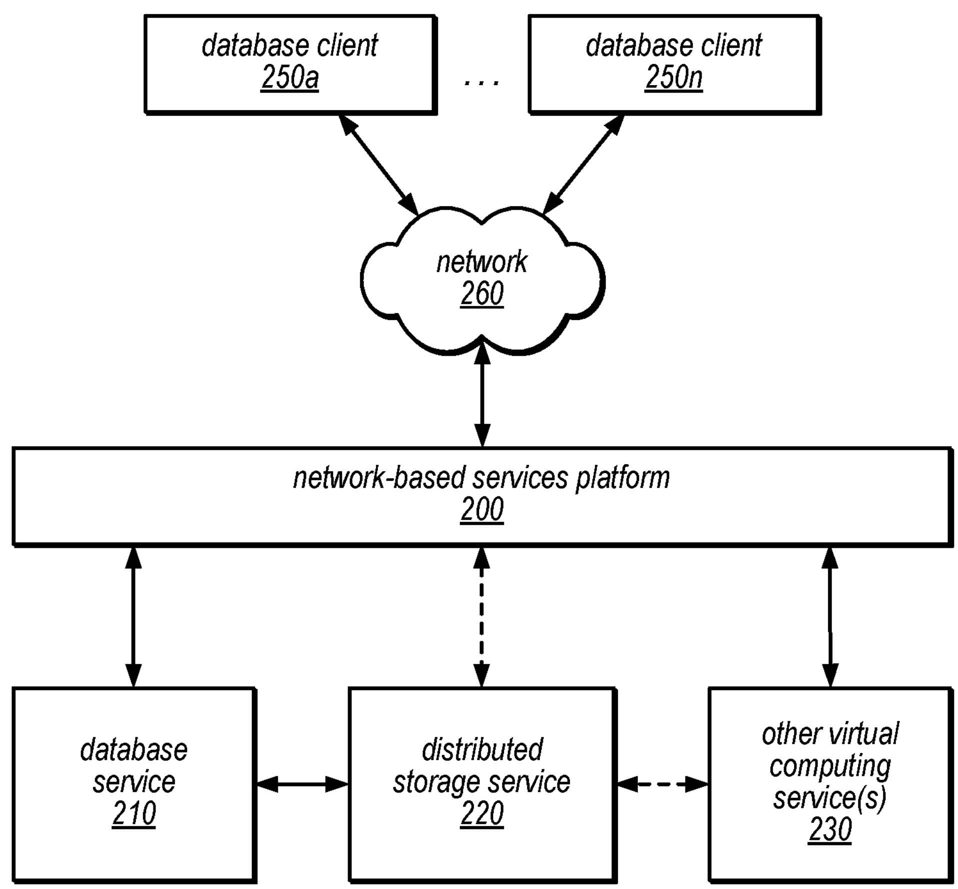
FIG. 2 is a block diagram illustrating a service system architecture that may be configured to implement a network-based database service and a network-based distributed storage service that utilizes continuous backup of data stored for the database service in the network-based distributed storage service, according to some embodiments.

One embodiment of a service system architecture that may be configured to implement a network-based services-based database service is illustrated in FIG. 2. In the illustrated embodiment, a number of clients (shown as clients 250*a*-250*n*) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a restored version of a data volume at a particular point in time, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a restore volume request, parameters of a restore volume request, read request, restore a version of data volume, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing (e.g. another data storage service, such as an object data store which may store data objects that make up a backup version data volumes stored in the distributed storage service 2200. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250*a* through 250*n*, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
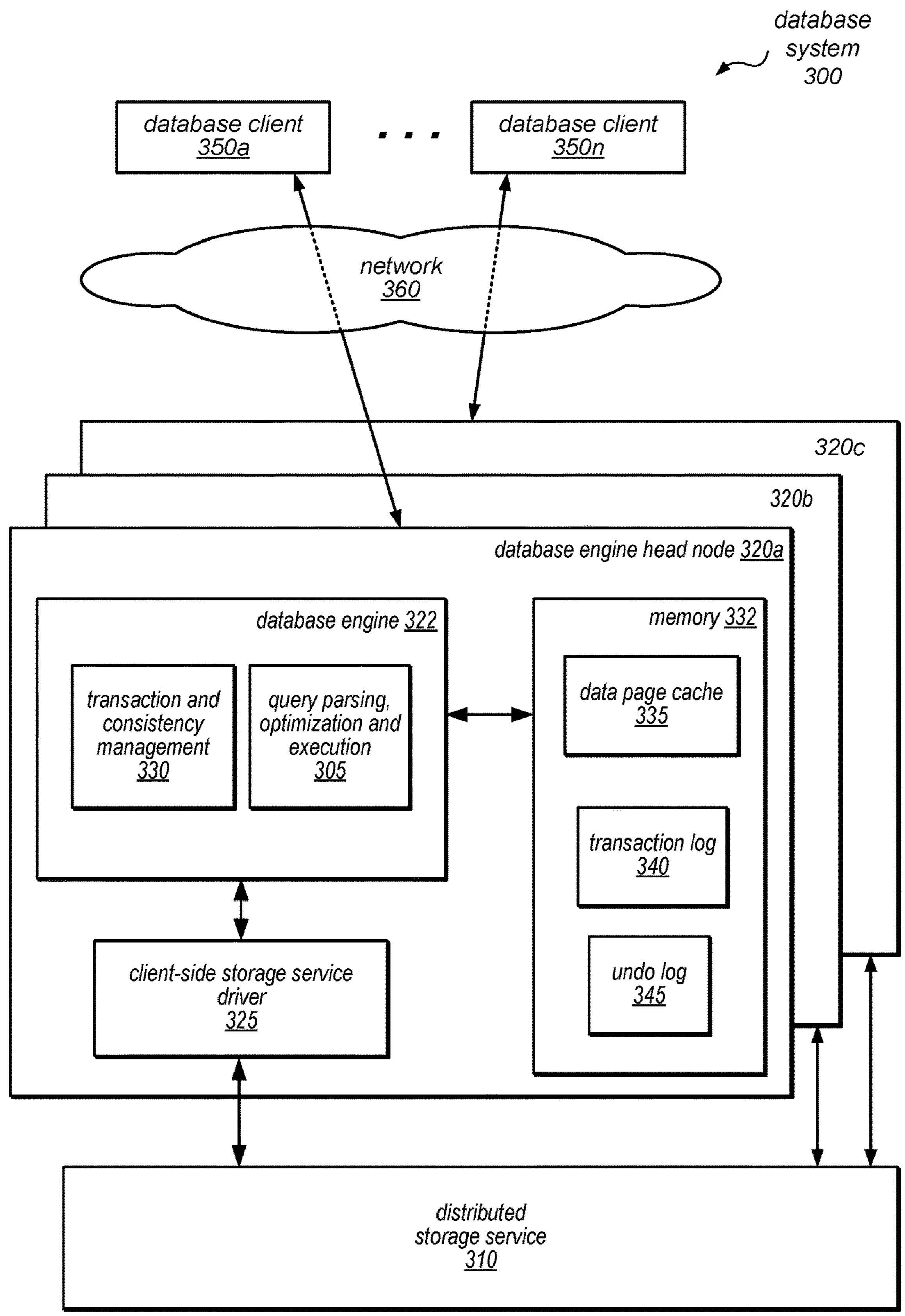
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350*a*-350*n*). As illustrated in this example, one or more of database clients 350*a*-350*n* may access a database head node 320 (e.g., head node 320*a*, head node 320*b*, or head node 320*c*, each of which is a component of a respective database instance) via network 360 (e.g., these components may be network-addressable and accessible to the database clients 350*a*-350*n*). However, distributed storage service 310, which may be employed by the database system to store a database volume (such as data pages of one or more databases, as well as redo log records and/or other metadata associated therewith) on behalf of database clients 350*a*-350*n*, and to perform other functions of the database system as described herein, may or may not be network-addressable and accessible to the storage clients 350*a*-350*n*, in different embodiments. For example, in some embodiments, distributed storage service 310 may perform various storage, access, change logging, recovery, log record manipulation, and/or space management operations in a manner that is invisible to storage clients 350*a*-350*n*.

As previously noted, each database instance may include a single database engine head node 320 that receives requests (e.g., a restore volume request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320*a* may perform these functions for queries that are received from database client 350*a* and that target the database instance of which database engine head node 320*a* is a component. In some embodiments, query parsing, optimization, and execution component 305 may return query responses to database client 350*a*, which may include write acknowledgements, requested data pages (or portions thereof), error messages, and or other responses, as appropriate. As illustrated in this example, database engine head node 320*a* may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350*a*). Client-side storage device may maintain mapping information about the database volume stored in distributed storage service 310, such that a particular protection group maintaining a partition of the database volume may be determined. Read requests and redo log records may then be routed to storage nodes that are members of the protection group according to the partition of user data to which the read request is directed or to which the redo log record pertains.

In this example, database engine head node 320*a* includes a data page cache 335, in which data pages that were recently accessed may be temporarily held. As illustrated in FIG. 3, database engine head node 320*a* may also include a transaction and consistency management component 330, which may be responsible for providing transactionality and consistency in the database instance of which database engine head node 320*a* is a component. For example, this component may be responsible for ensuring the Atomicity, Consistency, and Isolation properties of the database instance and the transactions that are directed that the database instance. As illustrated in FIG. 3, database engine head node 320*a* may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320*b* and 320*c*) may include similar components and may perform similar functions for queries received by one or more of database clients 350*a*-350*n* and directed to the respective database instances of which it is a component.

In some embodiments, the distributed storage systems described herein may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term “data block”. More specifically, a storage page may be a set of contiguous sectors. It may serve as the unit of allocation in SSDs, as well as the unit in log pages for which there is a header and metadata. In some embodiments, and in the context of the database systems described herein, the term “page” or “storage page” may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
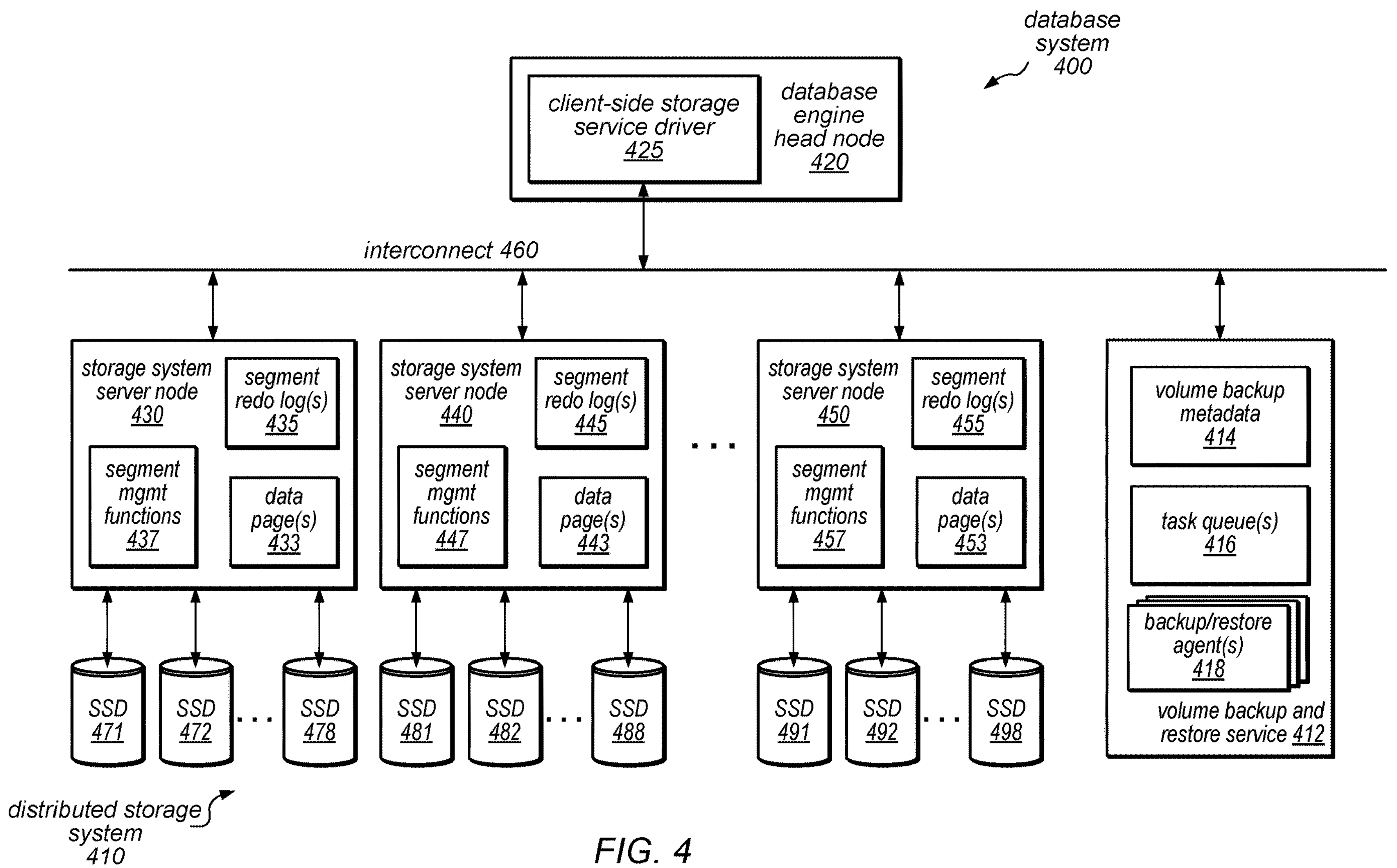
FIG. 4 is a block diagram illustrating a distributed storage system and backup and restore service for the distributed storage system, according to some embodiments.

One embodiment of a distributed storage system is illustrated by the block diagram in FIG. 4. In at least some embodiments, storage nodes 430-450 may store data for different clients as part of a multi-tenant storage service. For example, the various segments discussed above and below with regard to FIG. 9, may correspond to different protection groups and volumes for different clients.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system 410 may also implement a storage control plane. Storage control plane may be one or more compute nodes configured to perform a variety of different storage system management functions. For example, storage control plane may implement a volume manager (not illustrated), which may be configured to maintain mapping information or other metadata for a volume, such as current volume state, current writer, truncation tables or other truncation information, or any other information for a volume as it is persisted in varying different, extents, segments, and protection groups. The volume manager may be configured to communicate with a client of storage system 410, such as client-side driver 425 in order to "mount" or "open" the volume for the client, providing client-side driver 425 with mapping information, protection group policies, and various other information necessary to send write and read requests to storage nodes 430-450. The volume manager may be configured to provide the maintained information to storage clients, such as database engine head node 420 or client-side driver 425 or to other system components such as recovery service agents 418. For example, the volume manager may provide a current volume state (e.g., clean, dirty or recovery), current epoch indicator and/or any other information about the data volume.

In at least some embodiments, distributed storage system 410 may implement volume backup and restore service 412 which may be implemented as part of a control plane for distributed storage system 410 or as separate system or service. Volume backup and restore service 412 may implement multiple backup and restore agents which may assume responsibility for tasks in task queue(s) 416 and perform either backup or restore of data volumes stored at storage nodes, such as described below with regard to FIGS. 6 and 7. Task queue(s) 416 may be data structures that identify backup operations to be performed with respect to data volumes (e.g., describing the range of LSNs of redo log records being included in a chunk that is being generated and uploaded to the backup data store). Restore tasks, such as tasks to retrieve, unpack, and write data from different data chunks identified for a restore operation for a data volume may be recorded or maintained in task queues. Volume backup metadata 414 may include the volume geometry or configuration (e.g., as discussed below with regard to FIG. 9, including various extents, protection groups, stripes, etc.) and other information to generate a restored version of a data volume from data chunks stored in the separate backup data store. Note, in some embodiments, volume backup metadata 414 and task queue(s) 416 may be implemented in a separate storage service (e.g., a separate database service implementing database table that store task and metadata for data volumes which can be accessed by backup and recovery agent(s) 418).

Figure 5:
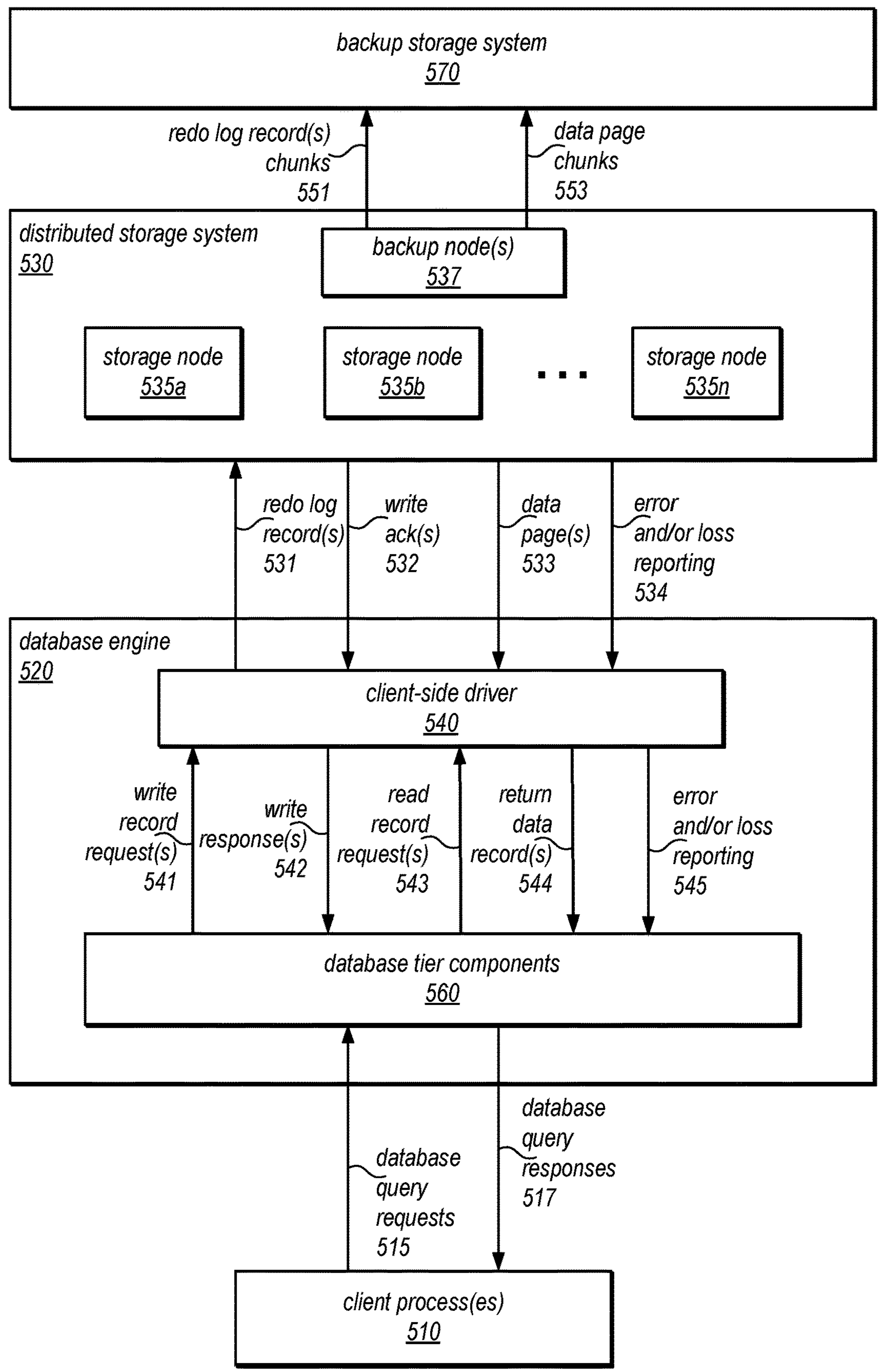
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database query requests 515 (which may include read and/or write requests targeting data stored on one or more of the storage nodes **535*a*-535*n*) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in distributed storage system 530. Storage nodes 535 may perform various peer-to-peer communications to replicate redo log records 531 received at a storage node to other storage nodes that may have not received the redo log records 431. For instance, not every storage node may receive a redo log record in order to satisfy a write quorum (e.g., 3 out of 5 storage nodes may be sufficient). The remaining storage nodes that do not receive or acknowledge the redo log record may receive an indication of it from a peer storage node that did acknowledge or receive the redo log record. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517**.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

Figure 12:
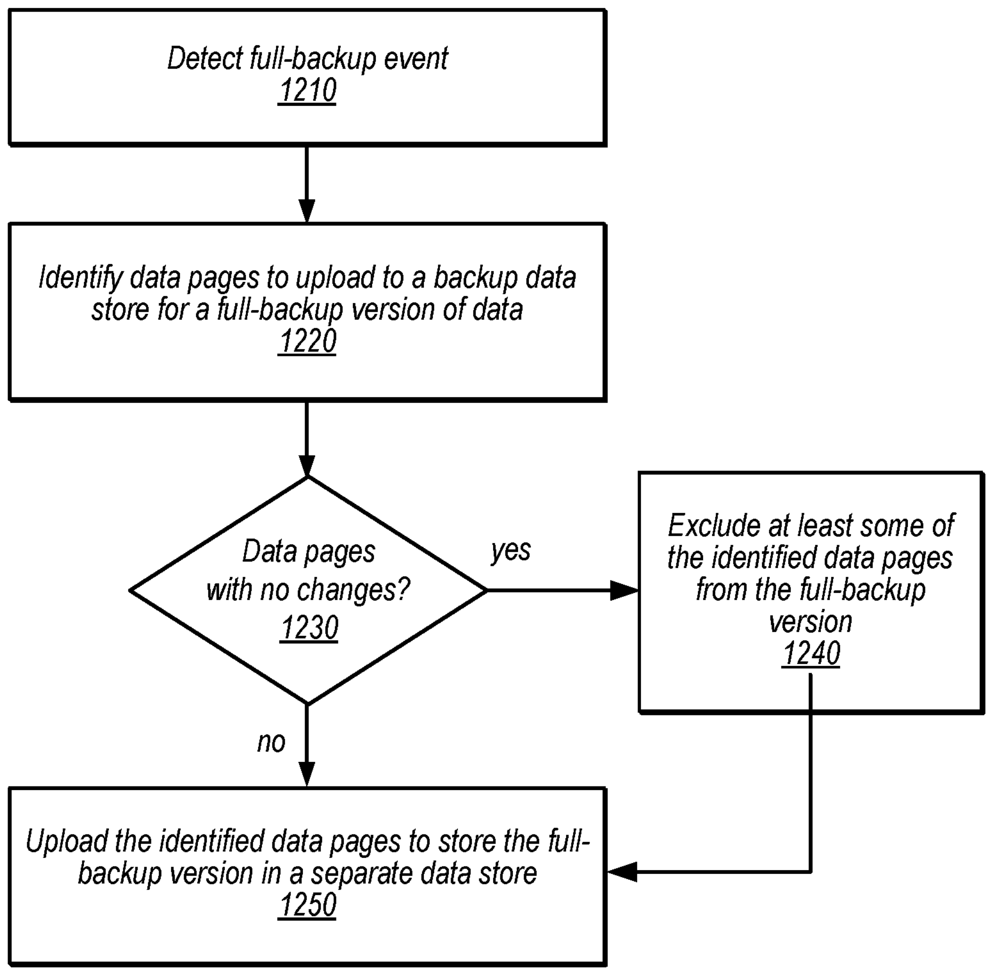
FIG. 12 is a high-level flowchart illustrating methods and techniques to implement generating a full-backup version of data in a backup data store, according to some embodiments.

In some embodiments, backup nodes 537 may receive peer-to-peer indications from storage nodes 535. By evaluating these indications backup nodes 537 may identify additional redo log records received at storage nodes 535 that have not been backed up. Backup node(s) 537 may send chunks or objects containing a set of redo log records 551 to backup storage system 570 to be stored as part of a backup version of the data volume. In some embodiments, data page chunks 553 to create a full backup of the data volume (as opposed to log records describing the changes to the data volume) may be requested from storage nodes and sent to backup storage system 570. FIG. 12, discussed below provides various examples of when data page chunks may be sent to storage system 570.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535$a$-535$n$, each of which may have multiple attached SSDs. In some embodiments, distributed storage system 530 may provide high durability for stored data block through the application of various types of redundancy schemes.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Note that in various embodiments, the API calls and responses between database engine 520 and distributed storage system 530 (e.g., APIs 531-534) and/or the API calls and responses between client-side driver 540 and database tier components 560 (e.g., APIs 541-545), and between distributed storage system 430 and backup data store 570 in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP)

technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C # and Perl to support integration with system components.

Figure 6:
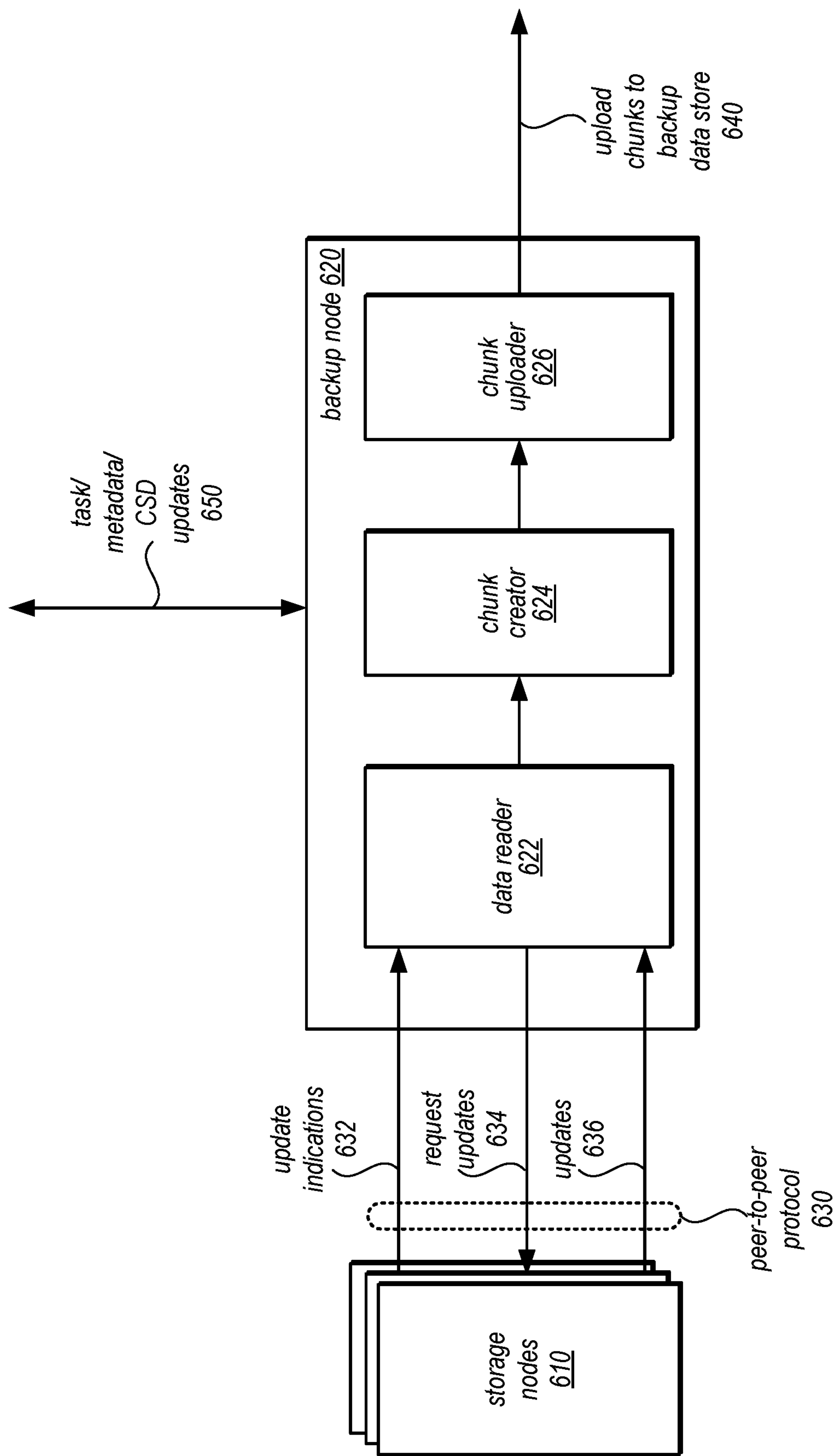
FIG. 6 is a logical block diagram illustrating a backup node, according to some embodiments.

As noted above, backup nodes may participate in peer-to-peer replication to identify updates backup versions of data volumes. FIG. 6 is a logical block diagram illustrating a backup node, according to some embodiments. Backup node 620 may retrieve or be assigned the task of performing backup for all or a portion of a data volume. In some embodiments, backup nodes may be assigned to perform backup operations with respect to one or multiple protection groups. Backup node assignments may be performed by obtaining a lease on tasks in task queue(s) 416 or by some other technique for acquiring exclusive rights to perform backup operations for the assigned data volume (or portion of the data volume, such as the data stored in one or more protection groups).

Backup node 620 may utilize peer-to-peer protocol 630 to communicate with storage nodes 610 (that maintain the assigned portion of the data volume, such as protection group members). Backup node 620 may implement data reader 622 to process update indicates 632 received from storage nodes 610. Update indications may identify the state or changes received for the data volume at a particular storage node. For example, in a log-structured data store, such as discussed above with regard to FIGS. 2-5, the indications may identify a log sequence number that identifies the point of completion up for the log at the storage node (indicating the state of the data volume described that point of the log). Data reader 622 may determine (e.g., based on local metadata at backup node 620, or tasks or metadata 650 received from task queues or volume metadata) the current state of the data volume (e.g., a highest log sequence number stored in a backup version of the data volume). If any of the storage nodes 610 are identified as maintaining higher log records, then as indicated at 634 the updates may be requested from the particular storage nodes that identify the higher log records, which may be returned 636 to data reader 622 for application to a backup version.

Backup node 620 may, in some embodiments, implement chunk creator 624 which may receive the retrieved log records and create data objects or chunks of log records to be uploaded to the separate data store that maintains the backup versions. In some embodiments, chunks may be determined according to a specific size (e.g., whole log records that may fill up 8 Mb chunk). Generated log record chunks may then be placed into a queue, buffer, or other structure so that chunk uploader 624 may retrieve and upload the chunks to the backup data store, as indicated at 640. When data chunks are upload tasks and/or other metadata may be updated 650 to indicate a new current state of backup versions of the data volume. In at least some embodiments, backup nodes may provide indications (e.g., to a CSD at a database engine head node or other component that directs garbage collection of storage space at storage nodes) of completed chunk uploads so that storage nodes may garbage collect or reclaim storage space storing the data uploaded in chunks to the separate data store. Although not illustrated in FIG. 6, similar interactions to perform a full backup of a data volume may be performed by backup node 620. A data reader, for instance, may identify data pages that have not changed between full backups stored in the backup data store and exclude those data pages from data chunks. For data pages that have changed, data reader 620 may retrieve the changed data pages and provide them to chunk creator 624 and chunk uploader 626 to be stored as part of a full backup of the data volume in the backup data store.

Different backup nodes may work independently and in parallel to perform backup operations for different protection groups of a data volume. In this way, backup operations may scale or change as the number of protection groups or storage nodes within protection groups change.

Figure 7:
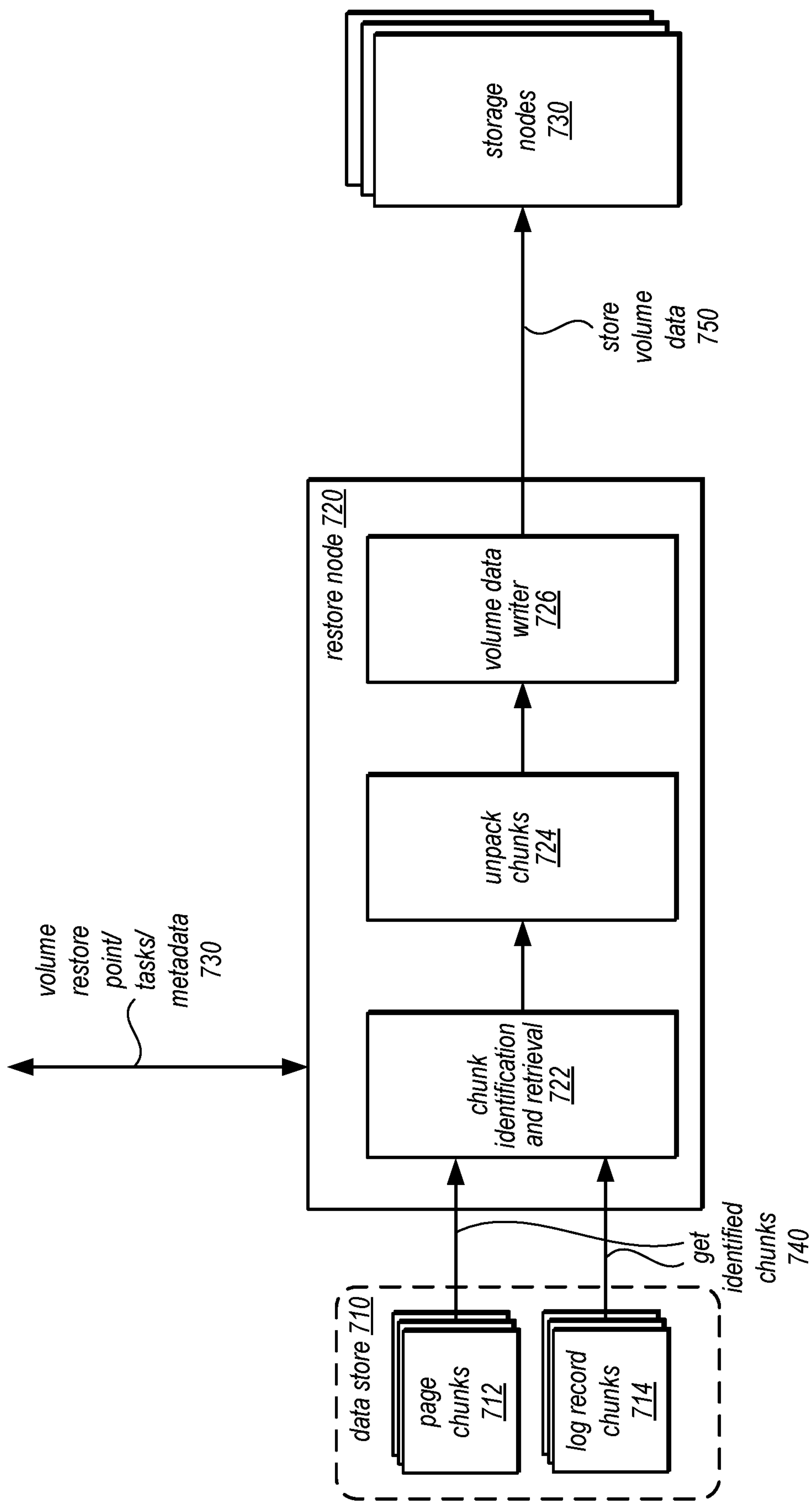
FIG. 7 is a logical block diagram illustrating a restore node, according to some embodiments.

Restore operations may be similarly performed by a restore node that interacts with the separate backup store and new storage nodes to store a restored version of the data volume. FIG. 7 is a logical block diagram illustrating a restore node, according to some embodiments. As with backup node 620 above, restore node 720 may obtain a restore task to create a volume at particular restore point. In order to determine which chunks in data store 710 to read, restore node 720 may implement chunk identification and retrieval 722. To identify the appropriate log record chunks 712 and page chunks 714, chunk identification and retrieval 722 may compare the restore point with metadata or other mapping information received at 730 to determine which are the most recent set of page chunks that create a full backup version of the data prior to the restore point, and any log record chunks that include log records up to the restore point (which can be applied to the pages described in the page chunk to create the version of the data volume restored at the restore point). Once chunk identification and retrieval 722 identifies the appropriate chunks, requests to get the identified chunks 740 may be made to data store 710. The received chunks may be unpacked, as indicated at 724, and volume data writer 726 may write the data volume at the restore point by applying log records to data pages (as appropriate) to create versions of the data pages to store 750 at storage nodes 730. The data may be stored according to the same configuration or geometry of the data volume identified for the data volume at the restore point (as data volume configuration/geometry information may be stored in data store backup 710 and/or as part of metadata for the volume backup). For example, data page chunks 714 may be specific to data pages stored in a particular protection group. When performing operations to restore the data volume, restore node 720 may restore that protection group at new storage nodes by retrieving the appropriate data chunks for the protection group and writing them to the new storage nodes to form a restored protection group of the data volume.

As with backup nodes, restore nodes may work in parallel to restore different portions of a data volume (e.g., different protection groups). In some embodiments, some restore nodes may restore page chunks while other restore nodes may restore log record chunks. Task updates and metadata updates may be made to queues/volume metadata to track the progress of the restore tasks so that if a restore node fails during a restore task, a new restore node may resume performance of the task.

A variety of different allocation models may be implemented for an storage device, such as an SSD mentioned above, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 8 and described below.

Figure 8:
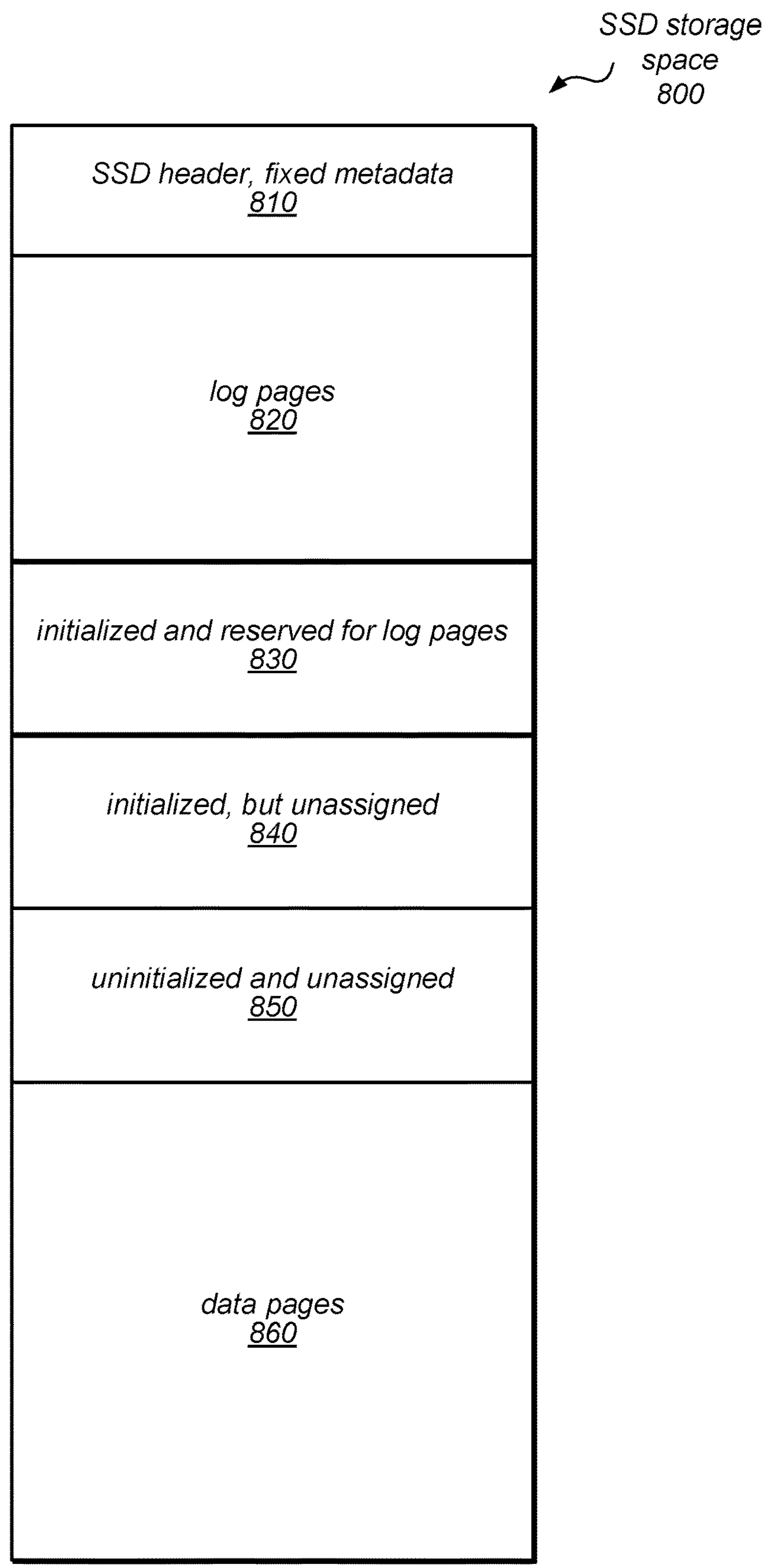
FIG. 8 is a block diagram illustrating how data and metadata may be stored on a storage node of a distributed storage system, according to some embodiments.

FIG. 8 is a block diagram illustrating how data and metadata may be stored on a given storage node (or persistent storage device) of a distributed storage system, according to one embodiment. In this example, SSD storage space 800 stores an SSD header and other fixed metadata in the portion of the space labeled 810. It stores log pages in the portion of the space labeled 820, and includes a space labeled 830 that is initialized and reserved for additional log pages. One portion of SSD storage space 800 (shown as 840) is initialized, but unassigned, and another portion of the space (shown as 850) is uninitialized and unassigned. Finally, the portion of SSD storage space 800 labeled 860 stores data pages.

In allocation approach illustrated in FIG. 8, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a data volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

Figure 9:
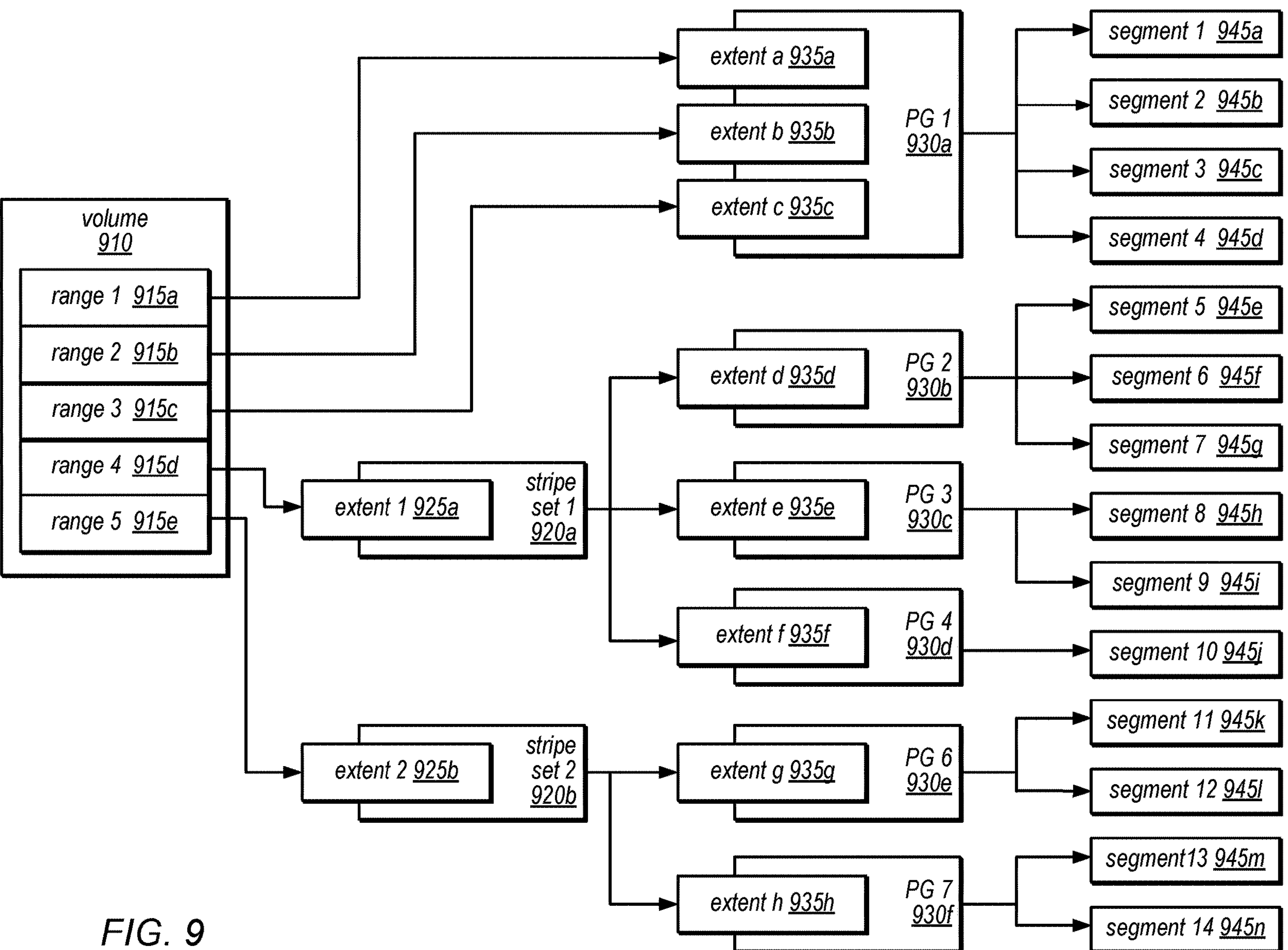
FIG. 9 is a block diagram illustrating an example configuration of a data volume, according to some embodiments.

FIG. 9 is a block diagram illustrating an example configuration of a database volume 910, according to one embodiment. In this example, data corresponding to each of various address ranges 915 (shown as address ranges 915*a*-915*e*) is stored as different segments 945 (shown as segments 945*a*-945*n*). More specifically, data corresponding to each of various address ranges 915 may be organized into different extents (shown as extents 925*a*-925*b*, and extents 935*a*-935*h*), and various ones of these extents may be included in different protection groups 930 (shown as 930*a*-930*f*), with or without striping (such as that shown as stripe set 920*a* and stripe set 920*b*). In this example, protection group 1 illustrates the use of erasure coding. In this example, protection groups 2 and 3 and protection groups 6 and 9 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (920*a*) and stripe set 2 (920*b*) illustrates how extents (e.g., extents 925*a* and 925*b*) may be striped into a volume, in some embodiments.

More specifically, in this example, protection group 1 (930*a*) includes extents a-c (935*a*-935*c*), which include data from ranges 1-3 (915*a*-915*c*), respectively, and these extents are mapped to segments 1-4 (945*a*-945*d*). Protection group 2 (930*b*) includes extent d (935*d*), which includes data striped from range 4 (915*d*), and this extent is mapped to segments 5-7 (945*e*-945*g*). Similarly, protection group 3 (930*c*) includes extent e (935*e*), which includes data striped from range 4 (915*d*), and is mapped to segments 8-9 (945*h*-945*i*); and protection group 4 (930*d*) includes extent f (935*f*), which includes data striped from range 4 (915*d*), and is mapped to segment 10 (945*j*). In this example, protection group 6 (930*e*) includes extent g (935*g*), which includes data striped from range 5 (915*e*), and is mapped to segments 11-12 (945*k*-945*l*); and protection group 7 (930*f*) includes extent h (935*h*), which also includes data striped from range 5 (915*e*), and is mapped to segments 13-14 (945*m*-945*n*).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

Figure 10:
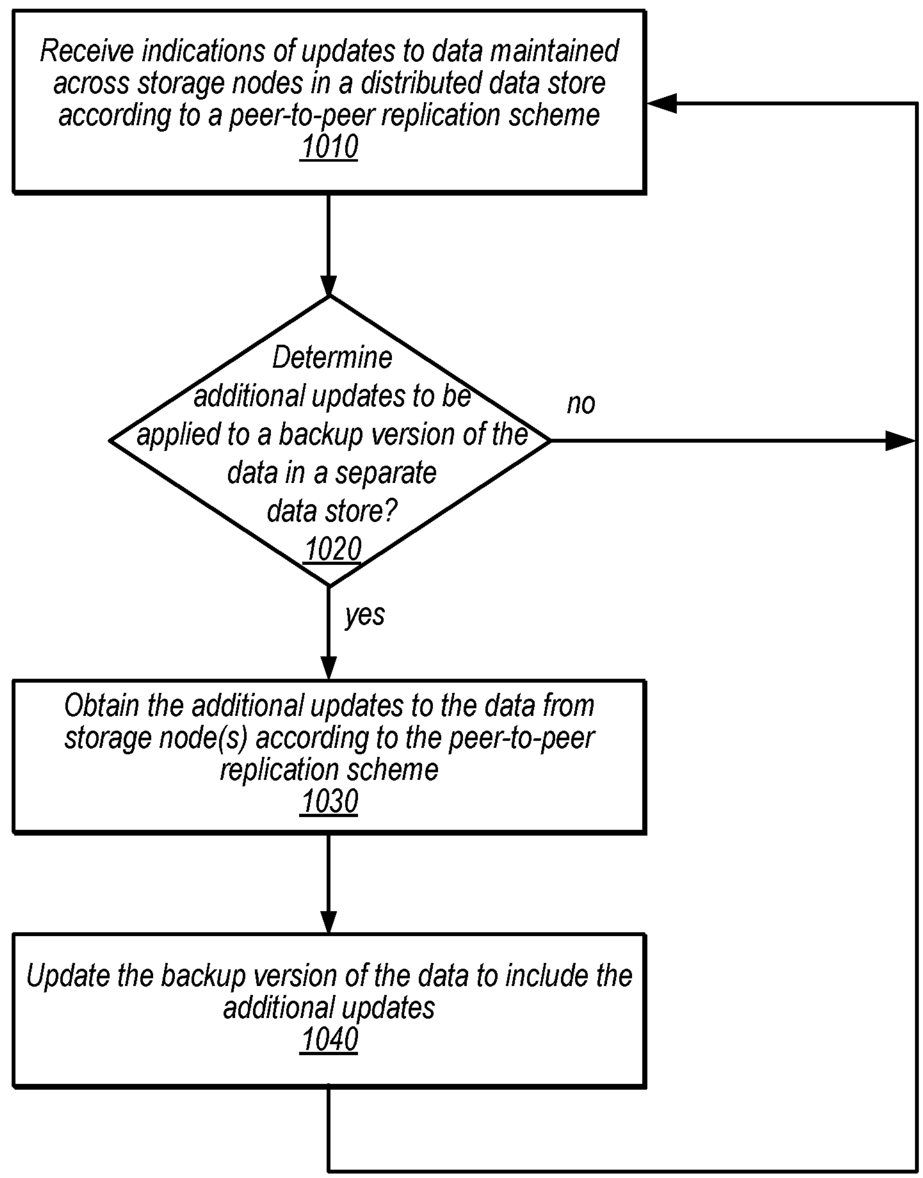
FIG. 10 is a high-level flowchart illustrating methods and techniques to implement continuous backup of data in a distributed data store, according to some embodiments.

The distributed storage service and database service discussed in FIGS. 2 through 9 provide examples of a distributed data store storing a data volume for a storage client (e.g., the database) and providing continuous back for the data volume. However, various other types of distributed storage systems may be implement continuous backup for data, which may not be log-structured, along with other types of storage clients, which may not be databases. FIG. 10 is a high-level flowchart illustrating methods and techniques to implement continuous backup of data in a distributed data store, according to some embodiments. Various different distributed data stores, volume recovery services, storage clients may implement the techniques described below.

As indicated at 1010, indications of updates to data maintained across storage nodes in a distributed data store may be received according to a peer-to-peer replication scheme. Data or data volumes may be maintained in different configurations, such as protection groups or other partitions, segments, or divisions of the data amongst different sets of storage nodes replicating the portion of data. Peer-to-peer replication schemes may be any replication scheme that allows updates made at one storage node maintaining data to be discovered and replicated by another storage node. Gossip-based protocols, for instance, may allow storage nodes to forward received updates (or indications indicating that an update has been received) to other storage nodes. In some embodiments, other storage nodes may request state or other information which may indicate updates received at the storage nodes (e.g., log sequence numbers, timestamps, or other update identifiers). Like other storage nodes, a backup node or other component performing continuous backup may request and/or receive the indications utilizing the same peer-to-peer replication scheme (e.g., utilizing the same API commands to establish connections, poll/request for update indications, retrieve updates, etc.).

As indicated at 1020, an evaluation of the indications may be performed to determine whether additional updates may need to be applied to a backup version of the data stored in a separate data store. For example, a current state of a backup version of data may be indicated by a log sequence number, timestamp, or other version indicator that is associated with a particular state of the data at a particular time. This current state may be compared with the indications of updates to determine if the update indications received are already included in the backup version of data. If the updates are included already, then no additional updates are needed for the backup version of the data store, and the backup node may ignore the received indications and continue to receive and evaluate new update indications, as indicated by the negative exit from 1020 and loop back to element 1010.

If additional updates are determined, as indicated by the positive exit from 1020, then the additional updates may be obtained from the storage nodes according to the replication scheme as shown in 1030. For example, share requests, or other requests formatted according to the peer-to-peer replication protocol may be sent to the storage nodes that indicated the additional updates. Once the additional updates are obtained, then as indicated at 1040, the backup version of the data may be updated to include additional updates. Backup versions of data may be formatted in different ways. In some embodiments, backup versions of data may include one or more data objects that describe a full-backup version of the data (e.g., a consistent version of each data page in a protection group or across a data volume) and one or more data objects that describe changes to the full-backup version. In this way, additional updates may be quickly identified, obtained and stored in a backup data store without having to apply or create new versions of data pages directly. When a data volume is restored, as discussed above with regard to FIG. 7, then the objects describing the changes may be applied to the full-backup version objects.

Figure 11:
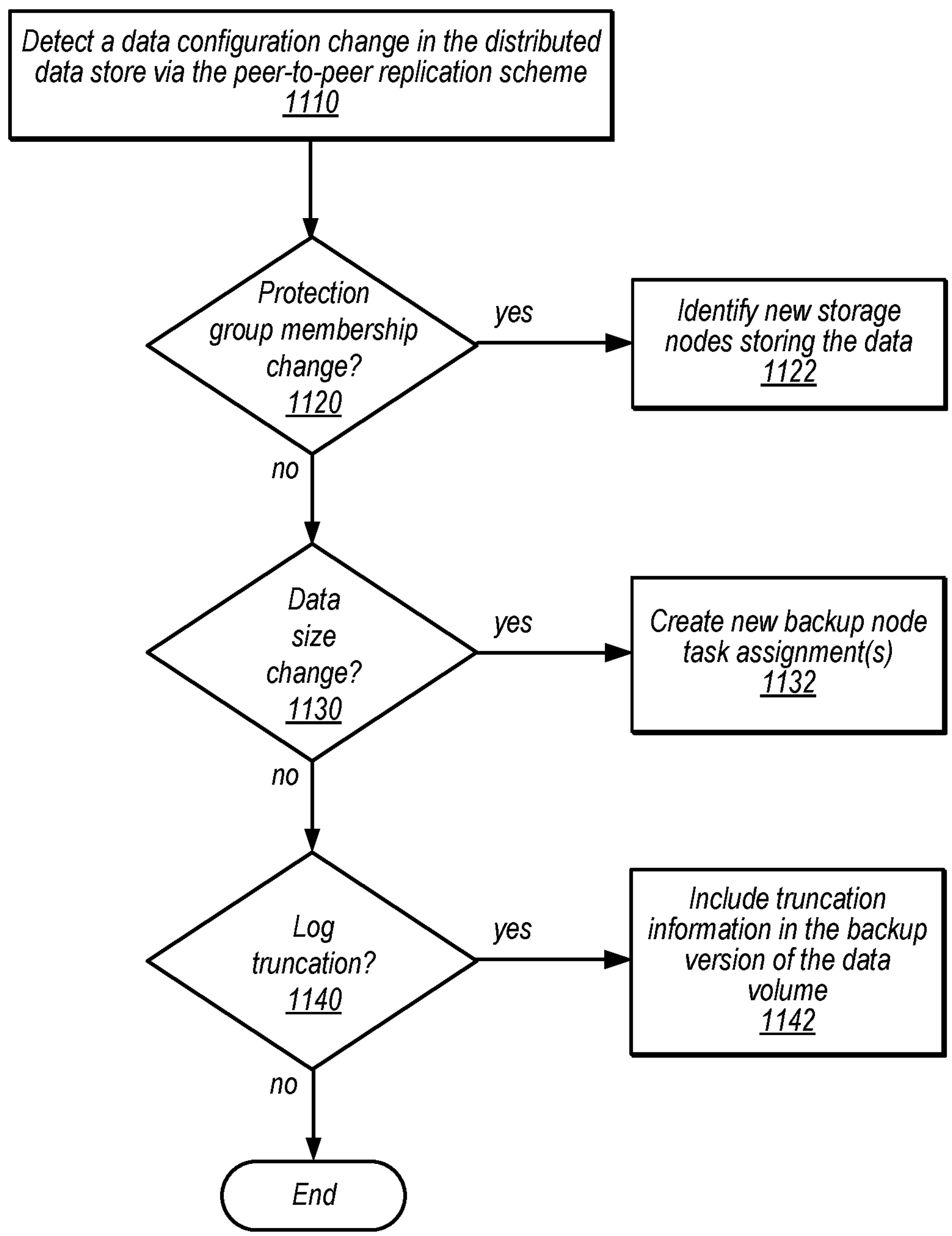
FIG. 11 is a high-level flowchart illustrating methods and techniques to detect changes in configuration of data and adapt continuous backup for the data in a distributed data store, according to some embodiments.

By participating in peer-to-peer communications with storage nodes, a backup node may detect changes in the configuration of data. Backup nodes may then initiate responsive actions to adapt continuous backup to account for the changes in the configuration of the data. FIG. 11 is a high-level flowchart illustrating methods and techniques to detect changes in configuration of data and adapt continuous backup for the data in a distributed data store, according to some embodiments. As indicated at 1110, a change in the configuration of the data in the distributed data store may be detected in the peer-to-peer replication scheme. For example, peer-to-peer communications may include an identifier, such as an epoch or version number associated with the data, which is associated with a current configuration of the data. If the configuration is changed as result of various types of events, the identifier would change. Storage nodes aware of the change may communicate the changed identifier (and possibly the reason for the change) to other storage nodes/backup node when communicating. Storage nodes/backup node may then discover the reason for the change and adapt accordingly. In the case of the backup node, backup tasks may be updated in a task queue, backup metadata, or other tracking information maintained for performing continuous backup for the data.

One example of a change that may be detected, is a protection group membership change, as indicated at 1120. Protection group membership changes may occur when storage nodes fail, become stressed, or are reassigned from a protection group maintaining a portion of data (e.g., an extent of a data volume). The membership change may include adding new storage nodes to take the place of old storage nodes or additional storage nodes to increase the number of storage nodes in the protection group. The backup node detecting the change may, as indicated at 1122, identify the new storage nodes in the membership change, and may modify backup node assignments, in some embodiments. For instance, the backup node may update tasks or create new tasks in a task queue or other set of backup tracking data to identify the change in PG membership, and that the backup node is going to assume responsibility for communicating with the new storage nodes.

Another example of a detected configuration change may be a data size change, as indicated at 1130. For instance, in some embodiments, data volumes may scale according to the needs of clients storing the data volume. As the data volume grows, additional extents, protection groups, segments, and so on, may need to be created at new storage nodes, as an alternative to changing the size of existing protection groups. Instead of increasing the burden on existing backup node(s) to perform continuous backup for the new protection groups, new backup node task assignments may be created, as indicated at 1132, in order to initiate continuous backup for the new protection groups.

Another example of a detected configuration change may be a log truncation, as indicated at 1140. For log-structured data stores that store updates to data as log records (e.g., as discussed in FIGS. 2-9 above), a truncation event may occur when a failure, error, or other operation creates an inconsistent state for the data in the log which is resolved by truncating or excluding a portion of the log from being considered valid. A truncation point or range, for example, may indicate that log records with sequence numbers after the point or in the range are ignored and not considered valid changes to the data. When truncation events occur, a backup node may include the backup version of the data in the backup data store, as indicated at 1142, so that when restored versions are created, the truncated portions of the log are not included in the restored version of the data.

As noted above, in addition to including individual updates to a backup version of a data store, a full backup version may be occasionally created by a backup node utilizing similar techniques. FIG. 12 is a high-level flowchart illustrating methods and techniques to implement generating a full-backup version of data in a backup data store, according to some embodiments. As indicated at 1210, a full-backup event may be detected (e.g., by a backup node or other distributed data store component). Various conditions may trigger a full-backup event. In some embodiments, a full-backup event may be triggered after a certain amount of updates (e.g., >2 GB of updates) have been stored to a backup data store. In other examples, the number of updates since a last full-backup version or the amount of time (e.g., 30 mins.) since a last full-backup version is uploaded may trigger a full-backup event.

Once detected, data pages of a consistent version of the data may be identified to upload to a backup data store for a full-backup version of the data, as indicated at 1220. For example, the data pages may all be associated with or inclusive of log records up to a particular log sequence number or timestamp. Data pages with no changes may be identified, as indicated at 1230. In some embodiments, as indicated at 1240, at least some of those data pages with no changes since a last upload of a full-backup version may be excluded from uploads for the current full-backup version being generated. For example, if no log records or other update indications are directed toward a data page then it may be identified as having no changes. For those data pages that are excluded, place holders or links to objects containing the unchanged data records may be included. As indicated at 1250, the identified data pages may be uploaded to store the full-backup version of the data in a separate data store. For example, data objects or chunks of data pages may be stored in the separate data store. Note that in some embodiments, full-backup versions may be stored as a group of data objects that correspond to different portions of the data (e.g., different segment or extent portions) that include whole data pages. So it may be that a data object may be uploaded with some data pages that have no changes and some data pages with changes, whereas those data objects with data pages that have no changes may not be uploaded, as indicated at 1240. In some embodiments, a limitation on a number of place holders or links to an object in a prior full-backup version may be imposed so that a new copy of the linked data object may be uploaded along with data objects with changes in response to a full-backup event.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 13:
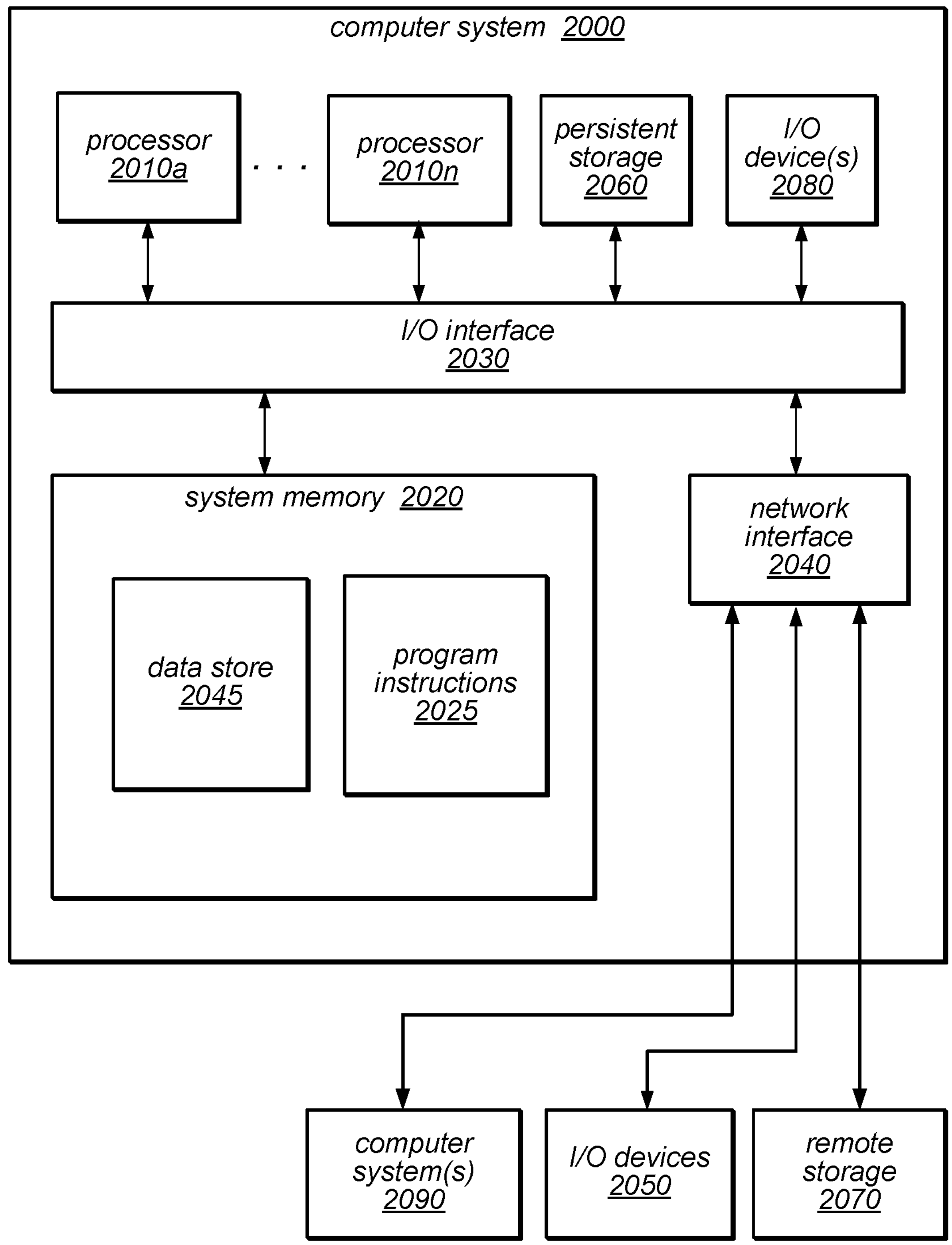
FIG. 13 is an example computer system, according to various embodiments.

FIG. 13 is a block diagram illustrating a computer system configured to implement the distributed data store providing continuous backup of data in a distributed data store according to various embodiments, as well as various other systems, components, services or devices described above. For example, computer system 2000 may be configured to implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes, backup nodes, or restore nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to:

detect, at a backup node that applies updates to a backup version of a data volume, a configuration change for the data volume, wherein the data volume is stored in a distributed data store across a plurality of storage nodes that provide the updates to the backup node according to a peer-to-peer replication scheme used to replicate updates to the data volume among the plurality of storage nodes and the backup node; and adapt, by the backup node, performance of obtaining additional updates to the data volume according to the peer-to-peer replication scheme based, at least in part, on the detected configuration change.

2. The system of claim 1, wherein the data configuration change is a change to the plurality of storage nodes that store the data volume; and wherein to adapt the performance of obtaining additional updates to the data volume, the program instructions cause the at least one processor to identify a new storage node storing the data volume that participates in the peer-to-peer replication scheme.

3. The system of claim 2, wherein the change to the plurality of storage nodes adds a storage node the plurality of storage nodes.

4. The system of claim 2, wherein the change to the plurality of storage nodes replaces one of the plurality of storage nodes.

5. The system of claim 1, wherein the data configuration change is a data size change of the data volume; and wherein to adapt the performance of obtaining additional updates to the data volume, the program instructions cause the at least one processor to identify subsequent updates to be applied to the backup version of the according to a new task assignment that accounts for an additional backup node added for updating the backup version of the data volume.

6. The system of claim 1, wherein the distributed data store is a log-structured data store; wherein the data configuration change is a log truncation for the data volume; and wherein to adapt the performance of obtaining additional updates to the data volume, the program instructions cause the at least one processor to obtain truncation information to include in the backup version of the data volume.

7. The system of claim 1, wherein the data configuration change is detected based, at least in part, on a change to an identifier associated with a configuration of the data volume.

8. A method, comprising:

detecting, at a backup node that applies updates to a backup version of a data volume, a configuration change for the data volume, wherein the data volume is stored in a distributed data store across a plurality of storage nodes that provide the updates to the backup node according to a peer-to-peer replication scheme used to replicate updates to the data volume among the plurality of storage nodes and the backup node; and adapting, by the backup node, performance of obtaining additional updates to the data volume according to the peer-to-peer replication scheme based, at least in part, on the detected configuration change.

9. The method of claim 8, wherein the data configuration change is a change to the plurality of storage nodes that store the data volume; and wherein adapting the performance of obtaining additional updates to the data volume comprises identifying a new storage node storing the data volume that participates in the peer-to-peer replication scheme.

10. The method of claim 9, wherein the change to the plurality of storage nodes adds a storage node the plurality of storage nodes.

11. The method of claim 9, wherein the change to the plurality of storage nodes replaces one of the plurality of storage nodes.

12. The method of claim 8, wherein the data configuration change is a data size change of the data volume; and wherein adapting the performance of obtaining additional updates to the data volume comprises identifying subsequent updates to be applied to the backup version of the according to a new task assignment that accounts for an additional backup node added for updating the backup version of the data volume.

13. The method of claim 8, wherein the distributed data store is a log-structured data store; wherein the data configuration change is a log truncation for the data volume; and wherein adapting the performance of obtaining additional updates to the data volume comprises obtaining truncation information to include in the backup version of the data volume.

14. The method of claim 8, wherein the data configuration change is detected based, at least in part, on a change to an identifier associated with a configuration of the data volume.

15. One or more non-transitory, computer-readable storage media, storing program instructions that when executed on or across one or more computing devices cause the one or more computing devices to implement:

detecting, at a backup node that applies updates to a backup version of a data volume, a configuration change for the data volume, wherein the data volume is stored in a distributed data store across a plurality of storage nodes that provide the updates to the backup node according to a peer-to-peer replication scheme used to replicate updates to the data volume among the plurality of storage nodes and the backup node; and adapting, by the backup node, performance of obtaining additional updates to the data volume according to the peer-to-peer replication scheme based, at least in part, on the detected configuration change.

16. The one or more non-transitory, computer-readable storage media of claim 15, wherein the data configuration change is a change to the plurality of storage nodes that store the data volume; and wherein, in adapting the performance of obtaining additional updates to the data volume, the program instructions cause the one or more computing devices to implement identifying a new storage node storing the data volume that participates in the peer-to-peer replication scheme.

17. The one or more non-transitory, computer-readable storage media of claim 16, wherein the change to the plurality of storage nodes adds a storage node the plurality of storage nodes.

18. The one or more non-transitory, computer-readable storage media of claim 16, wherein the change to the plurality of storage nodes replaces one of the plurality of storage nodes.

19. The one or more non-transitory, computer-readable storage media of claim 15, wherein the data configuration change is a data size change of the data volume; and wherein, in adapting the performance of obtaining additional updates to the data volume, the program instructions cause the one or more computing devices to implement identifying subsequent updates to be applied to the backup version of the according to a new task assignment that accounts for an additional backup node added for updating the backup version of the data volume.

20. The one or more non-transitory, computer-readable storage media of claim 15, wherein the distributed data store is a log-structured data store;

wherein the data configuration change is a log truncation for the data volume; and wherein, in adapting the performance of obtaining additional updates to the data volume, the program instructions cause the one or more computing devices to implement obtaining truncation information to include in the backup version of the data volume.

* * * * *